June 7, 1927.
B. K. BASHO
1,631,457
PEANUT AND POTATO DIGGER
Filed July 26, 1924
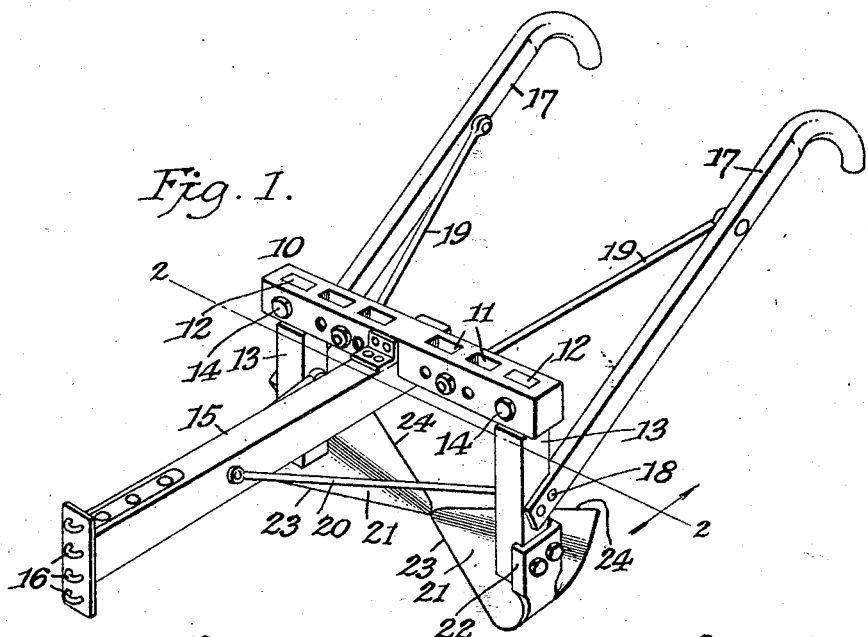
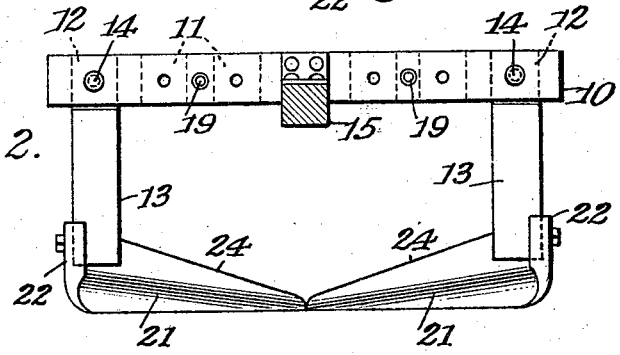
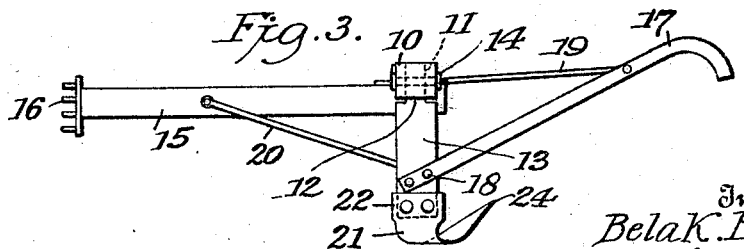
Inventor,
Bela K. Basho,
By his Attorney Patented June 7, 1927.

1,631,457

UNITED STATES PATENT OFFICE.

BELA K. BASHO, OF NEW YORK, N. Y.

PEANUT AND POTATO DIGGER.

Application filed July 26, 1924. Serial No. 728,290.

This invention relates to peanut and potato diggers devised for one horse power and one man operation and is also adapted for use in thinning cotton, breaking up corn stubs, etc.

An object being to provide demountable, reversible and adjustable means whereby a complete cross cut of a row of roots may be accomplished, said cutting means being so formed that the severed roots may be carried rearwardly and outwardly and deposited in the furrows between the rows.

A feature of the invention resides in demountable, reversible and adjustable oppositely arranged cutting blades which may have their ends overlapped at the center of the cutting line when going through heavy or tough roots, or said blades may be reversed on their supporting posts to extend outwardly to act as coverers.

A further feature is formed in the particular angles of the cutting edges and those of the rear upturned delivery edges of the blades or shares.

In order that the invention may be clearly understood and readily carried into effect, the same will now be described more fully with reference to the accompanying drawings, in which, Fig. 1, is a perspective view of my improved peanut digger.

Fig. 2, is a cross sectional elevation taken on the line 2—2 of Fig. 1 with parts omitted.

Fig. 3 is a reduced side elevation of the digger.

Referring to the drawings:

A cross beam 10, is provided with a series of rectangular openings 11, extending vertically therethrough, and in a pair of which the tongues 12, of vertically arranged posts, 13, are received and held by cross bolts 14.

A draft beam 15, is fixed to the cross beam 10, and at its front is carried a series of eyes 16, to either of which the traction power may be attached to vary the cut of the digger.

Guide handles 17, are secured to the posts 13, as at 18, and braced by stay rods 19, passing through the cross beam 10.

The draft beam is also braced by stay rods 20, connected thereto and to said posts.

Cutting blades 21, having channeled heads 22, are bolted to the lower ends of the posts 13, the sides of the channels engage the sides of the posts to retain the blades in rigid relation.

The blades have inwardly and backwardly inclined cutting edges 23, with the inner ends at least touching to effect a complete cross cut from furrow to furrow of a row of peanuts or the like.

The rear edges 24, of the cutting blades are turned upwardly and are inclined backwardly and outwardly from the free ends of said blades to effect a ready discharge or delivery of the severed roots to the side of the machine and into the opposite furrows.

The posts 13, are adjustable along the cross beam 10, to cause the blade points to overlap when cutting heavy or tough vegetation.

The construction of the channeled heads 22, of the blades are such that the blades may be reversed on their posts to extend outwardly therefrom to act as coverers, the post for this purpose, being moved to the innermost position.

It is thought that the operation and utility of the device will be apparent without further description, and it is to be understood that the structural elements thereof are susceptive to such variations and modification as fall within the scope of the claims.

Having thus described my invention, what I claim as new, is:—

1. In a peanut and potato digger, a frame comprising a cross beam and a draft beam secured thereto, posts bolted to said cross beam, cutting blades carried on the posts, said blades having inwardly and backwardly directed cutting edges with the inner ends touching or overlapping to effect a complete cross cut, said blades also being turned upwardly at the rear edges, the same being inclined backwardly and outwardly from the free ends of the blades for the purpose specified, and means for guiding the digger.

2. In a peanut and potato digger, a frame comprising a cross beam and a draft beam secured thereto, posts bolted to said cross beam, cutting blades carried on the posts, said blades having inwardly and backwardly directed cutting edges with the inner ends touching or overlapping to effect a complete cross cut, said blades also being turned upwardly at the rear edges, the same being inclined backwardly and outwardly from the free ends of the blades for the purpose specified, said posts being adjustable along the cross beam to cause the blade points to overlap when cutting heavy vegetation, and means for guiding the digger.

3. In a peanut and potato digger, a frame comprising a cross beam and a draft beam secured thereto, posts bolted to said cross beam, cutting blades carried on the posts, said blades having inwardly and backwardly directed cutting edges with the inner ends touching or overlapping to effect a complete cross cut, said blades also being turned upwardly at the rear edges, the same being inclined backwardly and outwardly from the free ends of the blades for the purpose specified, said posts being adjustable and said blades exchangeable, whereby they may be mounted with the points ranging outwardly to act as covering blades when planting, and means for guiding the digger.

4. In a peanut and potato digger, a frame comprising a cross beam and a draft beam secured thereto, posts bolted to said cross beam, cutting blades carried on the posts, said blades having inwardly and backwardly directed cutting edges with the inner ends touching or overlapping to effect a complete cross cut, said blades also being turned upwardly at the rear edges, the same being inclined backwardly and outwardly from the free ends of the blades for the purpose specified, said posts being adjustable along the cross beam to cause the blade points to overlap when cutting heavy vegetation, and means for guiding the digger, and a series of eyes on the draft beam whereby the point of attachment of the traction power may be varied as required.

Signed at New York, in the county of New York and State of New York, this 23rd day of July A. D. 1924.

BELA K. BASHO.